(12) United States Patent
Zhu et al.

(10) Patent No.: US 11,459,256 B2
(45) Date of Patent: Oct. 4, 2022

(54) TOWER-SHAPE INTEGRATED ECOLOGICAL PURIFICATION DEVICE FOR DOMESTIC SEWAGE IN SMALL TOWN

(71) Applicant: Institute of Mountain Hazards and Environment, Chinese Academy of Sciences, Chengdu (CN)

(72) Inventors: Bo Zhu, Chengdu (CN); Zhixin Dong, Chengdu (CN); Tao Wang, Chengdu (CN); Xiaoguo Wang, Chengdu (CN)

(73) Assignee: Institute of Mountain Hazards and Environment, Chinese Academy of Sciences, Sichuan (CN)

( * ) Notice: Subject to any disclaimer, the term of this patent is extended or adjusted under 35 U.S.C. 154(b) by 19 days.

(21) Appl. No.: 17/034,197

(22) Filed: Sep. 28, 2020

(65) Prior Publication Data

US 2021/0107819 A1  Apr. 15, 2021

(30) Foreign Application Priority Data

Oct. 9, 2019 (CN) .......................... 201910954551.4

(51) Int. Cl.
*C02F 3/32* (2006.01)
*C02F 9/00* (2006.01)
(Continued)

(52) U.S. Cl.
CPC ................ *C02F 3/327* (2013.01); *C02F 3/10* (2013.01); *C02F 3/32* (2013.01); *C02F 3/325* (2013.01);
(Continued)

(58) Field of Classification Search
CPC .. C02F 3/327; C02F 9/00; C02F 1/441; C02F 3/322; C02F 3/34; C02F 2103/005;
(Continued)

(56) References Cited

U.S. PATENT DOCUMENTS

| 4,824,572 A * | 4/1989 | Scott ........................ C02F 1/76 210/602 |
| 4,997,568 A * | 3/1991 | Vandervelde ........... C02F 3/046 210/603 |

(Continued)

FOREIGN PATENT DOCUMENTS

CN          103613198 A  *  3/2014

*Primary Examiner* — Fred Prince
(74) *Attorney, Agent, or Firm* — Simpson & Simpson, PLLC

(57) ABSTRACT

The present invention discloses a tower-shape integrated ecological purification device for domestic sewage in a small town. The device includes a water storage and filter pond, a medium reverse osmosis pond, an amphibious biological reaction system, and an aquatic biological reaction system. The amphibious biological reaction system and the aquatic biological reaction system are alternately connected from the top down. The amphibious biological reaction system and the aquatic biological reaction system form an alternating dry and wet, oxidation-reduction compound environment. Plant absorption, biological substrate transformation, aeration, and strengthening medium adsorption are combined to form a multi-stage plant-microbe-animal integrated ecological purification treatment process/device. The present invention achieves the efficient purification and acceptable discharge of domestic sewage in small towns.

18 Claims, 3 Drawing Sheets

(51) Int. Cl.
*C02F 3/10* (2006.01)
*C02F 1/44* (2006.01)
*C02F 3/34* (2006.01)
*C02F 1/00* (2006.01)
*C02F 1/28* (2006.01)
*C02F 1/74* (2006.01)
*C02F 3/30* (2006.01)
C02F 103/00 (2006.01)
C02F 3/00 (2006.01)

(52) U.S. Cl.
CPC ............ *C02F 9/00* (2013.01); *C02F 1/001* (2013.01); *C02F 1/004* (2013.01); *C02F 1/281* (2013.01); *C02F 1/441* (2013.01); *C02F 1/74* (2013.01); *C02F 3/301* (2013.01); *C02F 3/308* (2013.01); *C02F 3/322* (2013.01); *C02F 3/34* (2013.01); *C02F 2003/001* (2013.01); *C02F 2103/005* (2013.01); *C02F 2301/08* (2013.01); *Y02W 10/10* (2015.05); *Y02W 10/37* (2015.05)

(58) Field of Classification Search
CPC ...... C02F 3/10; C02F 1/004; C02F 2003/001; C02F 3/32; C02F 3/325; C02F 1/001; C02F 1/281; C02F 1/74; C02F 3/301; C02F 3/308; C02F 2301/08; Y02W 10/10; Y02W 10/37
USPC .......... 210/601, 602, 615, 616, 617, 170.08, 210/261, 262
See application file for complete search history.

(56) References Cited

U.S. PATENT DOCUMENTS

| | | | |
|---|---|---|---|
| 5,958,239 A * | 9/1999 | Sing | C02F 3/02 210/605 |
| 8,721,886 B2 * | 5/2014 | Ahn | C02F 3/302 210/605 |
| 2009/0139927 A1 * | 6/2009 | Kania | A01G 31/00 210/602 |
| 2015/0315050 A1 * | 11/2015 | Chai | C02F 3/302 210/137 |
| 2019/0047888 A1 * | 2/2019 | Jin | C02F 1/004 |
| 2019/0230877 A1 * | 8/2019 | Fulford | A01G 31/02 |
| 2020/0383276 A1 * | 12/2020 | Walker | B63B 35/38 |
| 2021/0009450 A1 * | 1/2021 | Yang | C02F 3/327 |

* cited by examiner

TOWER-SHAPE INTEGRATED ECOLOGICAL PURIFICATION DEVICE FOR DOMESTIC SEWAGE IN SMALL TOWN

CROSS-REFERENCE TO RELATED APPLICATIONS

This application claims the benefit under 35 U.S.C. § 119 of Chinese Patent Application No. 201910954551.4, filed Oct. 9, 2019, which application is incorporated herein by reference in its entirety.

FIELD

The present invention relates to the technical field of multi-stage ecological purification of domestic sewage, in particular to a tower-shaped integrated ecological purification device for domestic sewage in a small town.

BACKGROUND

With the acceleration of the process of urbanization and the increasing demand for water, the sewage discharge is increasing. Traditional septic tanks cannot meet the requirements of water environmental protection in villages and towns. A large amount of wastewater including kitchen wastewater, washing wastewater, toilet flushing wastewater, and flushing wastewater from small-scale breeding plant is directly discharged into soil, rivers, and lakes. The pollutants from domestic sewage in villages and towns are complex, with high concentration of organic matter and a certain amount of nitrogen (N) and phosphorus (P). Some domestic sewage contains heavy metals and toxic and harmful substances. If the sewage is discharged directly without treatment, it will cause water eutrophication and spread some epidemic diseases.

At present, ecological treatment is increasingly widely used in the field of rural sewage treatment due to its simple process, low operating cost, and obvious treatment effect. The commonly used ecological treatment techniques for rural sewage include constructed wetlands, lagoons, underground infiltration systems, and ecological ditches. The constructed wetland system mainly uses the substrate, plant roots, and microorganisms to purify sewage through physical, chemical, and biological actions. The lagoon uses solar energy as the initial energy to degrade, transform organic pollutants and realize resource recovery through material migration, transformation, and energy transfer in multiple food chains. The underground infiltration system mainly removes pollutants through physical adsorption, chemical precipitation, and biodegradation. These techniques combine sewage treatment with ecological engineering and overcome the shortcomings of high operating costs and complex maintenance and management of biochemical treatment (such as catalytic oxidation and sequencing batch reactor (SBR)). However, there are some disadvantages. 1) Large area and high construction cost. Especially in the underdeveloped mountainous areas where the topography is dominated by hills, it is difficult to find a large area of flat land to construct a sewage treatment system. 2) The biological techniques that use plant absorption as an important sewage treatment method are prone to pests and diseases. Besides, in winter, due to the low temperature, there are problems with plants overwintering and slow microbial metabolism, which leads to unstable water quality. 3) The ecological purification techniques may have secondary pollution, blockage and difficult and irregular later maintenance and management. Although the ecological purification system using natural drainage ditches could make full use of purification methods such as natural fall and plant absorption and effectively treat scattered domestic sewage, which features low investment and simple management. However, it is difficult to apply in small towns with low terrain and short drainage ditches. In order to carry out stable and efficient purification of domestic sewage in small towns and simplify later maintenance and management, it is urgent to develop a low-cost, low-power small-scale integrated ecological purification system for domestic sewage. This will be a key control technique for the treatment of domestic sewage in China under high-speed urbanization, and is an important part in protecting the water environment and promoting the construction of harmonious small towns. Meanwhile, this is of special and important strategic significance for the sustainable development of China's rural areas and the security of China's water resources.

In view of this, the present invention proposes a tower-shaped integrated ecological purification device for domestic sewage in a small town. The present invention overcomes the shortcomings of the prior art, such as vulnerability to pests, diseases and climatic change, high costs of construction, operation and management, unstable water quality, and short lasting time. In the prior art, it is difficult to find a large area of flat land to construct a sewage treatment system in underdeveloped mountainous areas where the topography is dominated by hills, and to apply the ecological purification system using natural drainage ditches in villages and towns with low terrain and short drainage ditches.

SUMMARY

In order to solve the problems mentioned in the background, an objective of the present invention is to provide a tower-shaped integrated ecological purification device for domestic sewage in a small town.

To achieve the above objective, the present invention provides the following technical solution.

A tower-shaped integrated ecological purification device for domestic sewage in a small town, including a water storage and filter pond, an amphibious biological reaction system and an aquatic biological reaction system, where reaction ponds of the amphibious biological reaction system and reaction ponds of the aquatic biological reaction system are alternately connected from the top the tower-shaped integrated ecological purification device down to form a height drop; the amphibious biological reaction system includes a reverse-osmosis-amphibious plant reaction pond, an amphibious plant reaction pond and an amphibious biological reaction pond in sequence from the top of the amphibious biological reaction system down to the bottom of the amphibious biological reaction system; the aquatic biological reaction system includes a reverse-osmosis-aquatic plant reaction pond, an aquatic plant reaction pond and an aquatic biological reaction pond in sequence from the top of the aquatic biological reaction system down to the bottom of the aquatic biological reaction system.

As a further preferred aspect of the technical solution, the water storage and filter pond includes a sewage water inlet and a first water outlet, and the sewage water inlet and the first water outlet are respectively provided on two opposite sides of the water storage and filter pond.

As a further preferred aspect of the technical solution, the sewage water inlet is 60 cm from the bottom of the pond, and the first water outlet is 50 cm from the bottom of the pond; the sewage water inlet is provided with a bamboo grill with a spacing of 3 cm, and the first water outlet is provided with a bamboo grill with a spacing of 0.5 cm.

As a further preferred aspect of the technical solution, the reverse-osmosis-amphibious plant reaction pond includes a first water outlet, a medium reverse-osmosis pond, a filling layer and a second water outlet; the first water outlet is 90 cm from the bottom of the reverse-osmosis-amphibious plant reaction pond; the medium reverse-osmosis pond is provided at a water outlet end of the first water outlet; the filling layer includes a sediment medium layer, amphibious plants and microorganisms; the second water outlet is 35 cm from the bottom of the reverse-osmosis-amphibious plant reaction pond, and is slightly higher than the sediment medium layer.

As a further preferred aspect of the technical solution, the reverse-osmosis-aquatic plant reaction pond includes a second water outlet, a medium reverse-osmosis pond, a filling layer and a third water outlet; the second water outlet is 90 cm from the bottom of the reverse-osmosis-aquatic plant reaction pond; the filling layer includes a sediment medium layer, aquatic plants and microorganisms; the aquatic plants have high pollutant removal efficiency; the third water outlet is 75 cm from the bottom of the reverse-osmosis-aquatic plant reaction pond.

As a further preferred aspect of the technical solution, a reverse-osmosis port is provided at the bottom of a partition of the medium reverse-osmosis pond; the reverse-osmosis pond is sequentially provided with a medium layer, a filter layer and a reverse-filter layer from the top of the medium reverse-osmosis pond down to the bottom of the medium reverse-osmosis pond; the medium layer is composed of montmorillonite (MTM-1) with a particle size of 0.01 mm to 0.03 mm and purplish shale (HWR-1) with a particle diameter of 0.5 mm to 2.0 mm in sequence along a direction of a water flow; the filter layer is formed by laying pebbles with a particle diameter of 10 mm to 50 mm from small to large along the direction of the water flow, with a thickness of 10 cm to 20 cm; the reverse-filter layer is formed by laying gravel and pebbles with a particle diameter of 10 mm to 50 mm from small to large along the direction of the water flow, with a thickness of 10 cm to 20 cm.

As a further preferred aspect of the technical solution, the amphibious plant reaction pond includes a third water outlet, a filling layer and a fourth water outlet; the filling layer includes a sediment medium layer, amphibious plants, microorganisms and plankton; the amphibious plants are composed of tall and dwarf amphibious plants; the plankton includes protozoa, algae, and some crustaceans and mollusks.

As a further preferred aspect of the technical solution, the aquatic plant reaction pond includes a fourth water outlet, a filling layer and a fifth water outlet; the filling layer includes a sediment medium layer, aquatic plants, microorganisms, and plankton.

As a further preferred aspect of the technical solution, the amphibious biological reaction pond includes a fifth water outlet, a filling layer and a sixth water outlet; the filling layer includes a sediment medium layer, amphibious plants, microorganisms, plankton and amphibious animals.

As a further preferred aspect of the technical solution, the aquatic biological reaction pond includes a sixth water outlet, a filling layer and a seventh water outlet; the filling layer includes a sediment medium layer, aquatic plants, microorganisms, plankton and aquatic animals.

As a further preferred aspect of the technical solution, the sediment medium layer is composed of coarse pebbles, fine pebbles, and fine sand with a gradually decreasing particle size from top of the sediment medium layer to bottom of the sediment medium layer; the coarse pebbles are 10 cm in thickness, the fine pebbles are 10 cm in thickness, and the fine sand is 5 cm in thickness; the sediment medium layer further includes a gravel pile located in a center of the pond; the gravel pile is composed of gravel or tile/ceramic pieces; the gravel pile attaches microorganisms, and grows plants on an upper part thereof.

Compared with the prior art, the present invention has the following beneficial effects:

1) The amphibious biological reaction system and the aquatic biological reaction system form an alternating dry and wet, oxidation-reduction compound environment. Plant absorption, biological substrate, aeration, and strengthening medium are combined into a multi-stage plant-microbe-animal integrated ecological purification treatment process/device, which efficiently removes pollutants in the domestic sewage.

2) The operating power of the system is mainly provided by ecological energy such as gravity energy, solar energy, and biological energy, which reduces consumption. The plants, animals, and microorganisms compose a self-purifying ecological system, reducing the cost of maintaining sewage treatment.

3) The present invention is especially suitable for sewage treatment in mountainous villages and towns, making full use of the natural terrain of the mountainous area to construct an integrated purification system featuring a small area and low operating cost.

4) The multi-stage plant-microbe-animal integrated ecological purification treatment process optimally combines the purification methods of falling aeration and plant absorption with soil microbial oxidation-reduction, animal ingestion, and other high-efficiency sewage treatment methods. It makes full use of the interdependence, mutual restriction, complementarity, and common stability of the various components of the ecosystem to construct a small-scale tower-shaped ecological purification system for domestic sewage featuring a reasonable structure, simple management, and low construction and operating costs. The system basically solves the long-standing problem of domestic sewage treatment in small towns in mountainous areas, and has great promotion and application value in the field of domestic sewage purification in vast villages and towns.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the present invention without creative efforts should fall within the protection scope of the present invention.

Example

Figure 1:
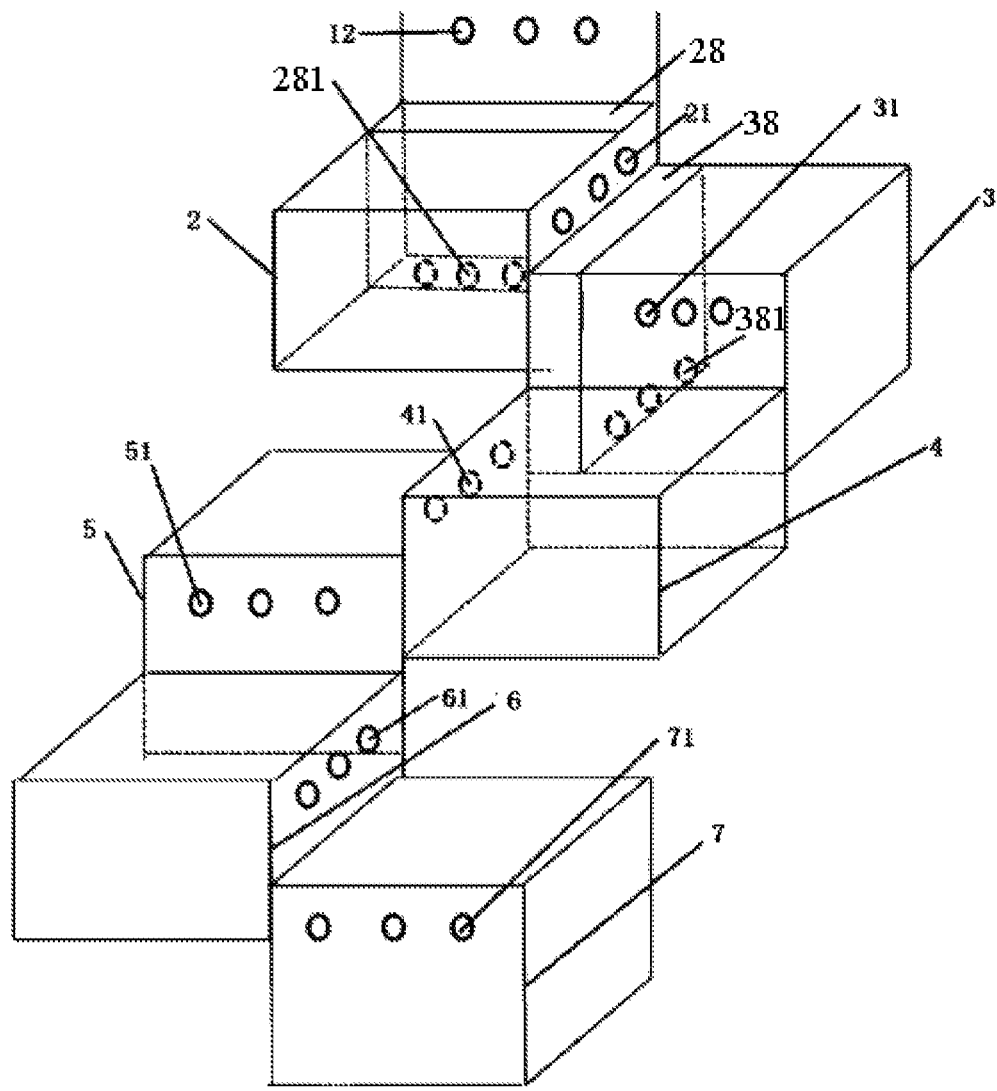
FIG. 1 is a structural diagram of the present invention.
Figure 2:
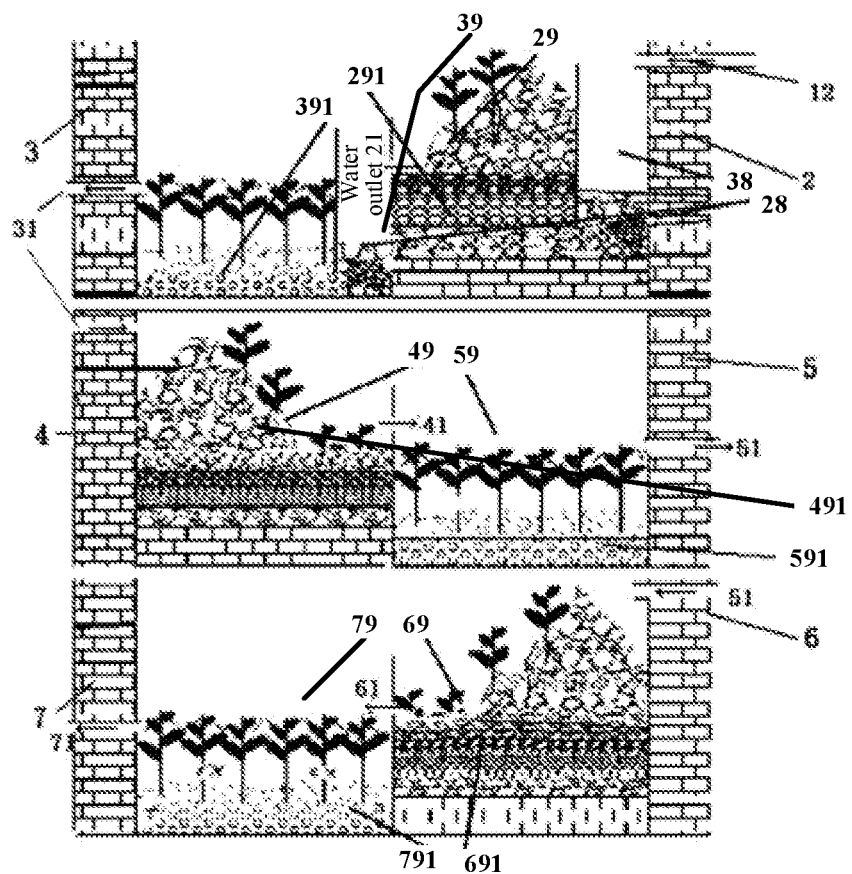
FIG. 2 is a structural diagram of an amphibious biological reaction system and an aquatic biological reaction system.
Figure 3:
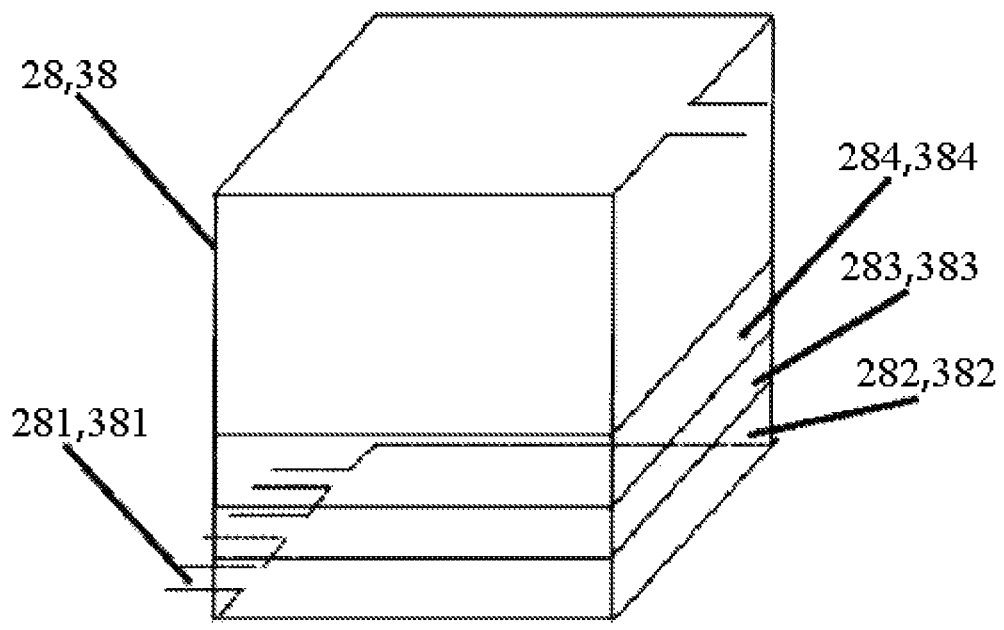
FIG. 3 is a structural diagram of a medium reverse-osmosis pond according to the present invention; and, FIG. 4 is a structural diagram of a water storage and filter pond according to the present invention.
Figure 4:
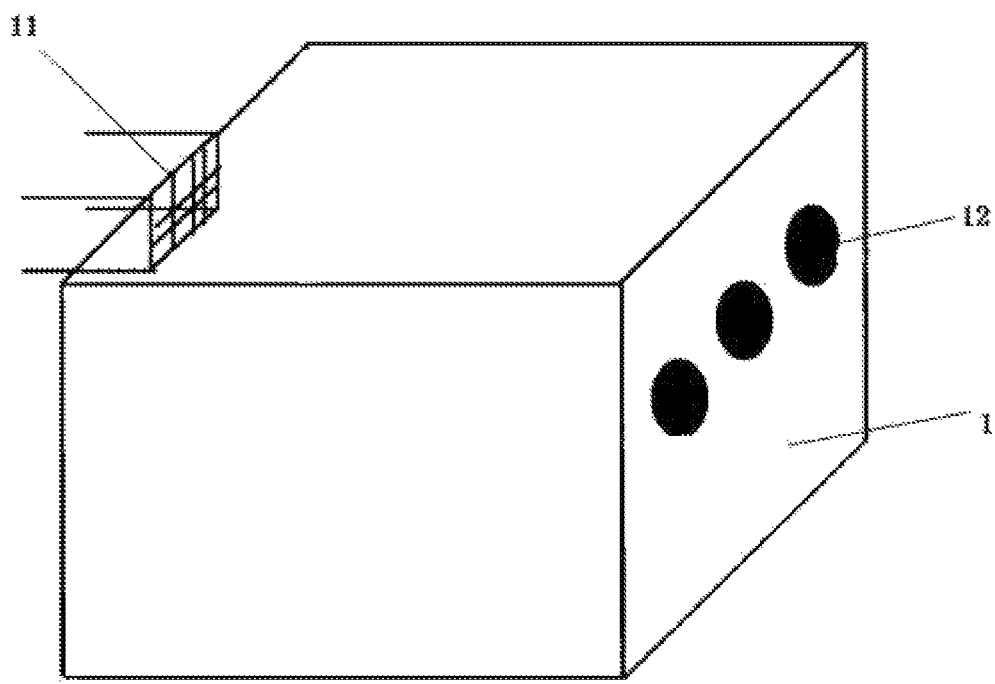

Referring to FIGS. 1-4, the present invention provides the following technical solution: a tower-shaped integrated ecological purification device for domestic sewage in a small town. The device includes a water storage and filter pond 1, an amphibious biological reaction system and an aquatic biological reaction system. Ponds of the amphibious biological reaction system and ponds of the aquatic biological reaction system are alternately connected from the top of the tower-shaped biological purification device down to form a height drop. The amphibious biological reaction system includes a reverse-osmosis-amphibious plant reaction pond 2, an amphibious plant reaction pond 4, and an amphibious biological reaction pond 6 in sequence from the top of the amphibious biological reaction system down to the bottom of the amphibious biological reaction system. The aquatic biological reaction system includes a reverse-osmosis-aquatic plant reaction pond 3, an aquatic plant reaction pond 5, and an aquatic biological reaction pond 7 in sequence from the top of the aquatic biological reaction system down to the bottom of the aquatic biological reaction system.

The tower-shaped integrated ecological purification device for domestic sewage in a small town uses an elevation difference to form an unpowered artesian channel. After domestic sewage is discharged and preliminarily filtered and precipitated, it flows in from a high place, and falls vertically into a medium reverse-osmosis pond to form an aeration condition to oxidize and reduce pollutants, thus reducing biochemical oxygen demand (BOD) and chemical oxygen demand (COD). Then, the sewage infiltrates into the plant reaction pond through a reverse-osmosis port at the bottom of the reverse-osmosis pond by a pressure difference. The amphibious biological reaction system and the aquatic biological reaction system form an alternating dry and wet, oxidation-reduction compound environment. Under this environment, harmful and toxic substances in the domestic sewage are efficiently removed through a multi-stage ecological purification treatment process including plant absorption, microbial oxidation-reduction, and animal ingestion. The plants, animals, and microorganisms in the biological reaction system compose a self-purifying ecological system, which reduces the cost of maintaining sewage treatment.

In this example, specifically, the amphibious biological reaction system has a size of 60 cm deep×120 cm long×120 cm wide, and the aquatic biological reaction system has a size of 90 cm deep×120 cm long×120 cm wide. Medium reverse-osmosis pond 8 is 30 cm away from a water inlet side, and a 5 cm high reverse-osmosis port 81 is provided at the bottom of a partition. After the domestic sewage is discharged and preliminarily filtered and precipitated, it flows into the ecological purification system from a high place, and falls vertically into medium reverse-osmosis pond 8 to form an aeration condition to oxidize and reduce pollutants, thus reducing BOD and COD. Then, the sewage infiltrates into the plant reaction pond through reverse-osmosis port 81 at the bottom of the reverse-osmosis pond by a pressure difference. Medium reverse-osmosis pond 8 prolongs the residence time of the sewage and ensures that all sewage is treated by each reaction system.

In this example, specifically, water storage and filter pond 1 includes sewage water inlet 11 and first water outlet 12. Sewage water inlet 11 and first water outlet 12 are respectively provided on two opposite sides of water storage and filter pond 1. Sewage water inlet 11 is provided with a bamboo grill with a spacing of 3 cm, and first water outlet 12 is provided with a bamboo grill with a spacing of 0.5 cm. First water outlet 12 is slightly lower than sewage water inlet 11 to form a pressure difference.

In this example, specifically, reverse-osmosis-amphibious plant reaction pond 2 includes first water outlet 12, medium reverse-osmosis pond 28, filling layer 29, and second water outlet 21. First water outlet 12 is 90 cm from the bottom of the reverse-osmosis-amphibious plant reaction pond. Medium reverse-osmosis pond 28 is provided at a water outlet end of first water outlet 12. The medium reverse-osmosis pond prolongs the residence time of the sewage and ensures that all sewage is treated by each reaction system. Filling layer 29 includes a sediment medium layer 291, amphibious plants, and microorganisms. Second water outlet 21 is 35 cm from the bottom of reverse-osmosis-amphibious plant reaction pond 2, and is slightly higher than sediment medium layer 291. Sediment medium layer 291 includes coarse pebbles with a layer height of 10 cm and a particle diameter of about 10 cm, fine pebbles with a layer height of 10 cm and a particle diameter of about 5 cm, fine sand with a layer height of 5 cm and a particle diameter of about 1.5 cm, and gravel or tile/porcelain pieces in sequence along a direction of a water flow. The sediment medium layer further includes a gravel pile located in a center of the pond. The gravel pile forms an upper aerobic-lower anaerobic compound environment, and is provided with microbial strains for nitrogen (N) and phosphorus (P) removal. Reverse-osmosis port 281 is provided at the bottom of the partition of medium reverse-osmosis pond 28. The reverse-osmosis pond is sequentially provided with medium layer 284, filter layer 283 and a reverse-filter layer 282 from the top of the reserve-osmosis pond down to the bottom of the reserve-osmosis pond. Medium layer 284 is composed of montmorillonite (MTM-1) with a particle diameter of 0.01 mm to 0.03 mm and purplish shale (HWR-1) with a particle diameter of 0.5 mm to 2.0 mm in sequence along the direction of the water flow. Filter layer 283 is formed by laying pebbles with a particle diameter of 10 mm to 50 mm from small to large along the direction of the water flow, with a thickness of 10 cm to 20 cm. Reverse-filter layer 282 is formed by laying gravel and pebbles with a particle diameter of 10 mm to 50 mm from small to large along the direction of the water flow, with a thickness of 10 cm to 20 cm. Tall plants (*Ficus microphylla, Phyllostachys heteroclada*) and dwarf plants (*Acorus calamus*) are planted in the pond. The root systems of the *Ficus microphylla* and the *Acorus calamus* are well-developed and resistant to erosion. The *Phyllostachys heteroclada* has high removal efficiency of carbon (C), N, and P pollutants in the sewage. The combination of tall and dwarf plants increases plant diversity and vegetation coverage, and increases pollutant absorption. The gravel, tile/ceramic pieces, and plant roots in the reaction pond attach microorganisms to form a biofilm, which improves the oxidation-reduction effect of microorganisms on pollutants. The plants have a well-developed root system with a strong ability to accumulate pollutants. The microorganisms are native strains for N and P removal. After the absorption by the amphibious plants and oxidation-reduction by the microorganisms in the reverse-osmosis-amphibious plant reaction pond, the sewage falls into the reverse-osmosis-aquatic plant reaction pond.

In this example, specifically, reverse-osmosis-aquatic plant reaction pond 3 includes second water outlet 21, medium reverse-osmosis pond 38, filling layer 39, and third water outlet 31. Second water outlet 21 is 90 cm from the bottom of the reverse-osmosis-aquatic plant reaction pond. Filling layer 39 includes sediment medium layer 391, aquatic plants (*Dichondra micrantha*) and microorganisms. The aquatic plants have high pollutant removal efficiency. Third water outlet 31 is 75 cm from the bottom of the reverse-osmosis-aquatic plant reaction pond. In this way, a waterlogged anaerobic environment is formed for microbial anaerobic reaction. The C, N, and P pollutants are further reduced through medium adsorption, *Dichondra micrantha* absorption, and microbial anaerobic oxidation. After the adsorption by the medium at the bottom of the pond and absorption by the aquatic plants, the sewage falls into the amphibious plant reaction pond.

In this example, specifically, amphibious plant reaction pond 4 includes third water outlet 31, filling layer 49, and fourth water outlet 41. Filling layer 49 includes sediment medium layer 491, amphibious plants, microorganisms, and plankton. The amphibious plants are composed of tall and dwarf amphibious plants. The plankton includes protozoa, algae, and some crustaceans and mollusks. The amphibious plants include tall plants having a well-developed root system with a strong ability to accumulate pollutants and dwarf plants having a well-developed root system to resist erosion. The combination of tall and dwarf plants increases plant diversity and vegetation coverage, and increases pollutant absorption. The microorganisms form a biofilm by the well-developed root system of the plants. After the absorption by the amphibious plants, oxidation-reduction by the microorganisms and ingestion by the plankton in the pond, the sewage falls into the aquatic plant reaction pond.

In this example, specifically, aquatic plant reaction pond 5 includes fourth water outlet 41, filling layer 59, and fifth water outlet 51. Filling layer 59 includes sediment medium layer 591, aquatic plants, microorganisms, and plankton. Sediment medium layer 591 adsorbs some organic matter and suspended matter. The gravel and tile/ceramic pieces are scattered in the pond to attach microorganisms to form a biofilm. After the anaerobic oxidation-reduction by the microorganisms, absorption by the aquatic plants, plankton ingestion and adsorption by the medium, the sewage falls into the amphibious biological reaction pond.

In this example, specifically, amphibious biological reaction pond 6 includes fifth water outlet 51, filling layer 69, and sixth water outlet 61. Filling layer 69 includes sediment medium layer 691, amphibious plants, microorganisms, plankton, and amphibious animals. The plankton includes protozoa, algae and some crustaceans and mollusks. The plankton directly ingests pollutants, microorganisms and plant secretions, sloughs, etc., so as to clean the environment of the reaction pond. The amphibious animals can accumulate pollutants, so as to improve the permeability of sediment medium layer 691, promote the absorption of pollutants by plant roots, and prevent the water outlet from being blocked. In addition to the absorption plants, the oxidation-reduction microorganisms and the ingestion plankton, the amphibious animals further enrich the food chains, and improve sewage treatment efficiency and the self-purification function of the reaction pond.

In this example, specifically, aquatic biological reaction pond 7 includes sixth water outlet 61, filling layer 79, and seventh water outlet 71. Filling layer 79 includes sediment medium layer 791, aquatic plants, microorganisms, plankton, and aquatic animals. The aquatic animals are mollusks. Pollutants are further reduced through biological assimilation, microbial denitrification, and predation of aquatic animals.

In the above example, sediment medium layer 291, 391, 491, 591, 691, 791 is composed of coarse pebbles, fine pebbles, and fine sand with a gradually decreasing particle diameter from top to bottom. The coarse pebbles are 10 cm in thickness, the fine pebbles are 10 cm in thickness, and the fine sand is 5 cm in thickness. Sediment medium layer 291, 391, 491, 591, 691, 791 further includes a gravel pile located in a center of the pond. The gravel pile is composed of gravel or tile/ceramic pieces. The gravel pile attaches microorganisms, and grows plants on an upper part thereof.

Specifically, sediment medium layer 291, 391, 491, 591, 691, 791 is sequentially composed of coarse pebbles with a height of 10 cm and a diameter of about 10 cm, fine pebbles with a height of 10 cm and a diameter of 5 cm, fine sand with a height of 3 cm and a diameter of 1.5 cm, fly ash with a height of 2 cm and a diameter of 1 cm, and gravel or tile/ceramic pieces with a diameter of 3 cm. The gravel pile is composed of gravel with a diameter of greater than 10 cm.

The microorganisms are native strains for N and P removal. The amphibious plants include tall plants having a well-developed root system with a strong ability to accumulate pollutants and dwarf plants having a well-developed root system to resist erosion. The aquatic plants have high pollutant removal efficiency. The plankton includes protozoa, algae, and some crustaceans and mollusks. The animals are small amphibious or aquatic animals that can accumulate pollutants. For example, earthworms can be raised in the pond to break and decompose coarse organic matter. They can improve the permeability of the sediment medium, promote the absorption of pollutants by plant roots, prevent blockage of the water outlet, enhance microbial oxidation (nitrification), and improve the removal rate of ammonia nitrogen. The aquatic animals can also be loaches. The C, N, and P pollutants are further reduced through the biological assimilation of *Dichondra micrantha*, microbial denitrification and predation of aquatic animals.

Working Principle: In operation, the domestic sewage is preliminarily filtered and precipitated by water storage and filter pond 1, and then first falls into reverse-osmosis-amphibious plant reaction pond 2. A falling aeration condition is formed to oxidize and reduce pollutants, thus reducing BOD and COD. Then, the sewage infiltrates into amphibious plant reaction pond 4 through reverse-osmosis port 81 at the bottom of medium reverse-osmosis pond 8 by a pressure difference. In the amphibious plant reaction pond, an amphibious environment is formed with stones, and amphibious plants are planted. The sewage is absorbed by the amphibious plants and oxidized and reduced by the microorganisms in the pond, and then falls into reverse-osmosis-aquatic plant reaction pond 3. After a short aeration in the reverse-osmosis pond, the sewage enters aquatic plant reaction pond 5 through reverse-osmosis port 81. After being absorbed by the medium at the bottom of the aquatic plant reaction pond and absorbed by the aquatic plants, the sewage falls into amphibious plant reaction pond 4. The microorganisms form a biofilm by the developed roots of plants. After the absorption by the amphibious plants, oxidation-reduction by the microorganisms and ingestion by the plankton in the pond, the sewage enters aquatic plant reaction pond 5. The sewage is subjected to microbial anaerobic oxidation-reduction, aquatic plant absorption, plankton ingestion, and medium adsorption in the pond, and then falls into amphibious biological reaction pond 6 and aquatic biological reaction pond 7. In amphibious biological reaction pond 6, in addition to the absorption plants, the oxidation-reduction microorganisms and ingestion plankton, amphibious and aquatic animals are added to enrich the food chains. In the alternating dry and wet, oxidation-reduction compound environment composed of the amphibious environment and aquatic environment, the gradually enhanced multi-stage ecological purification treatment process including plant absorption, microbial oxidation-reduction, and animal ingestion, the harmful and toxic substances in the domestic sewage are efficiently removed. The plants, aquatic animals, and microorganisms in the reaction ponds constitute a self-purifying ecological system, which reduces the cost of maintaining sewage treatment.

Although the examples of the present invention have been illustrated, it should be understood that those of ordinary skill in the art may make various changes, modifications, replacements, and transformations to the above examples without departing from the principle and spirit of the present invention, and the scope of the present invention is limited by the appended claims and their legal equivalents.

LIST OF REFERENCE NUMERALS

1 Water storage and filter pond
2 Reverse-osmosis-amphibious plant reaction pond
3 Reverse-osmosis-aquatic plant reaction pond
4 Amphibious plant reaction pond
5 Aquatic plant reaction pond
6 Amphibious biological reaction pond
7 Aquatic biological reaction pond
28 Medium reverse-osmosis pond of the reverse-osmosis amphibious plant reaction pond
38 Medium reverse-osmosis pond of the reverse-osmosis aquatic plant reaction pond
29 Filling layer of the reverse-osmosis amphibious plant reaction pond
39 Filling layer of the reverse-osmosis aquatic plant reaction pond
49 Filling layer of the amphibious plant reaction pond
59 Filling layer of the aquatic plant reaction pond
69 Filling layer of the amphibious biological reaction pond
79 Filling layer of the aquatic biological reaction pond
11 Sewage water inlet
12 First water outlet
21 Second water outlet
31 Third water outlet
41 Fourth water outlet
51 Fifth water outlet
61 Sixth water outlet
71 Seventh outlet
281 Reverse-osmosis port of the reverse-osmosis amphibious plant reaction pond
381 Reverse-osmosis port of the reverse-osmosis aquatic plant reaction pond
282 Reverse-filter layer of the reverse-osmosis amphibious plant reaction pond
382 Reverse filter layer of the reverse-osmosis aquatic plant reaction pond
283 Filter layer of the reverse-osmosis amphibious plant reaction pond
383 Filter layer of reverse-osmosis aquatic plant reaction pond
284 Medium layer of the reverse-osmosis amphibious plant reaction pond
384 Medium layer of the reverse-osmosis aquatic plant reaction pond
291 Sediment medium layer of the reverse-osmosis amphibious plant reaction pond
391 Sediment medium layer of the reverse-osmosis aquatic plant reaction pond
491 Sediment medium layer of the amphibious plant reaction pond
591 Sediment medium layer of the aquatic plant reaction pond
691 Sediment medium layer of the amphibious biological reaction pond
791 Sediment medium layer of the aquatic biological reaction pond

The invention claimed is:

1. A tower-shaped integrated ecological purification device for domestic sewage in a town, comprising a water storage and filter pond, an amphibious biological reaction system and an aquatic biological reaction system, wherein reaction ponds of the amphibious biological reaction system and reaction ponds of the aquatic biological reaction system are alternately connected from the top of the tower-shaped integrated ecological purification device down to form a height drop;

the reaction ponds of the amphibious biological reaction system comprises a reverse-osmosis amphibious plant reaction pond, an amphibious plant reaction pond, and an amphibious biological reaction pond in sequence from the top of the amphibious biological reaction system down to the bottom of the amphibious biological reaction system;

the reaction ponds of the aquatic biological reaction system comprises a reverse-osmosis aquatic plant reaction pond, an aquatic plant reaction pond, and an aquatic biological reaction pond in sequence from the top of the aquatic biological reaction system down to the bottom of the aquatic biological reaction system.

2. The tower-shaped integrated ecological purification device for domestic sewage in a town according to claim 1, wherein the water storage and filter pond comprises a sewage water inlet and a first water outlet; the sewage water inlet and the first water outlet are respectively provided on two opposite sides of the water storage and filter pond; the sewage water inlet is 60 cm from the bottom of the water storage and filter pond, and the first water outlet is 50 cm from the bottom of the water storage and filter pond; the sewage water inlet is provided with a bamboo grill with a spacing of 3 cm, and the first water outlet is provided with a bamboo grill with a spacing of 0.5 cm.

3. The tower-shaped integrated ecological purification device for domestic sewage in a town according to claim 1, wherein the reverse-osmosis-amphibious plant reaction pond comprises a first water outlet, a medium reverse-osmosis pond, a filling layer, and a second water outlet; the first water outlet is 90 cm from the bottom of the reverse-osmosis amphibious plant reaction pond; the medium reverse-osmosis pond is provided at an end of the first water outlet; the filling layer comprises a sediment medium layer, amphibious plants and microorganisms; the second water outlet is 35 cm from the bottom of the reverse-osmosis-amphibious plant reaction pond, and is higher than the sediment medium layer.

4. The tower-shaped integrated ecological purification device for domestic sewage in a town according to claim 3, wherein a reverse-osmosis port is provided at the bottom of a partition of the medium reverse-osmosis pond; the medium reverse-osmosis pond is sequentially provided with a medium layer, a filter layer, and a reverse-filter layer from the top of the medium reverse-osmosis pond down to the bottom of the medium reverse-osmosis pond; the medium layer is composed of montmorillonite with a particle diameter of 0.01 mm to 0.03 mm and purplish shale with a particle diameter of 0.5 mm to 2.0 mm in sequence along a direction of a water flow; the filter layer is formed by laying pebbles with a particle diameter of 10 mm to 50 mm from small to large along the direction of the water flow, with a thickness of 10 cm to 20 cm; the reverse-filter layer is formed by laying gravel and pebbles with a particle diameter of 10 mm to 50 mm from small to large along the direction of the water flow, with a thickness of 10 cm to 20 cm.

5. The tower-shaped integrated ecological purification device for domestic sewage in a town according to claim 4, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

6. The tower-shaped integrated ecological purification device for domestic sewage in a town according to claim 3, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

7. The tower-shaped integrated ecological purification device for domestic sewage in a town according to claim 1, wherein the reverse-osmosis-aquatic plant reaction pond comprises a second water outlet, a medium reverse-osmosis pond, a filling layer, and a third water outlet; the second water outlet is 90 cm from the bottom of the reverse-osmosis-aquatic plant reaction pond; the filling layer comprises a sediment medium layer, aquatic plants and microorganisms; the aquatic plants have high pollutant removal efficiency; the third water outlet is 75 cm from the bottom of the reverse-osmosis-aquatic plant reaction pond.

8. The tower-shaped integrated ecological purification device for domestic sewage in a town according to claim 7, wherein a reverse-osmosis port is provided at the bottom of a partition of the medium reverse-osmosis pond; the medium reverse-osmosis pond is sequentially provided with a medium layer, a filter layer, and a reverse-filter layer from the top of the medium reverse-osmosis pond down to the bottom of the medium reverse-osmosis pond; the medium layer is composed of montmorillonite with a particle diameter of 0.01 mm to 0.03 mm and purplish shale with a particle diameter of 0.5 mm to 2.0 mm in sequence along a direction of a water flow; the filter layer is formed by laying pebbles with a particle diameter of 10 mm to 50 mm from small to large along the direction of the water flow, with a thickness of 10 cm to 20 cm; the reverse-filter layer is formed by laying gravel and pebbles with a particle diameter of 10 mm to 50 mm from small to large along the direction of the water flow, with a thickness of 10 cm to 20 cm.

9. The tower-shaped integrated ecological purification device for domestic sewage in a town according to claim 8, wherein the sediment medium layer is composed of coarse pebbles with a particle diameter of 10 cm, fine pebbles with a particle diameter of 5 cm, and fine sand with a gradually decreasing particle diameter from top to bottom; the coarse pebbles are 10 cm in thickness, the fine pebbles are 10 cm in thickness, and the fine sand is 5 cm in thickness.

10. The tower-shaped integrated ecological purification device for domestic sewage in a town according to claim 7, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

11. The tower-shaped integrated ecological purification device for domestic sewage in a town according to claim 1, wherein the amphibious plant reaction pond comprises a third water outlet, a filling layer, and a fourth water outlet; the filling layer comprises a sediment medium layer, amphibious plants, microorganisms, and plankton; the amphibious plants are composed of tall and dwarf amphibious plants; the plankton comprises protozoa, algae and some crustaceans.

12. The tower-shaped integrated ecological purification device for domestic sewage in a town according to claim 11, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

13. The tower-shaped integrated ecological purification device for domestic sewage in a town according to claim 1, wherein the aquatic plant reaction pond comprises a fourth water outlet, a filling layer, and a fifth water outlet; the filling layer comprises a sediment medium layer, aquatic plants, microorganisms, and plankton.

14. The tower-shaped integrated ecological purification device for domestic sewage in a town according to claim 13, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

15. The tower-shaped integrated ecological purification device for domestic sewage in a town according to claim 1, wherein the amphibious biological reaction pond comprises a fifth water outlet, a filling layer, and a sixth water outlet; the filling layer comprises a sediment medium layer, amphibious plants, microorganisms, plankton, and amphibious animals.

16. The tower-shaped integrated ecological purification device for domestic sewage in a town according to claim 15, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

17. The tower-shaped integrated ecological purification device for domestic sewage in a town according to claim 1, wherein the aquatic biological reaction pond comprises a sixth water outlet, a filling layer, and a seventh water outlet; the filling layer comprises a sediment medium layer, aquatic plants, microorganisms, plankton, and aquatic animals.

18. The tower-shaped integrated ecological purification device for domestic sewage in a town according to claim 17, wherein the sediment medium layer is composed of coarse pebbles with a particle diameter of 10 cm, fine pebbles with a particle diameter of 5 cm, and fine sand with a particle diameter of 1.5 cm with a gradually decreasing particle diameter from top to bottom; the coarse pebbles are 10 cm in thickness, the fine pebbles are 10 cm in thickness, and the fine sand is 5 cm in thickness.

\* \* \* \* \*